United States Patent
Hohmann et al.

(10) Patent No.: US 9,381,632 B2
(45) Date of Patent: Jul. 5, 2016

(54) TENSIONING DEVICE FOR EXTENDING A THREADED BOLT, AND TOOL SUITABLE FOR THIS PURPOSE, PREFERABLY DRIVE ADAPTER

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 211 days.

(21) Appl. No.: 14/029,840

(22) Filed: Sep. 18, 2013

(65) Prior Publication Data

US 2014/0165789 A1    Jun. 19, 2014

(30) Foreign Application Priority Data

Sep. 18, 2012 (DE) ............ 20 2012 103 565 U

(51) Int. Cl.
  *B23B 29/02*  (2006.01)
  *B25B 23/00*  (2006.01)
  *B25B 29/02*  (2006.01)
  *B23P 19/06*  (2006.01)

(52) U.S. Cl.
  CPC .............. *B25B 29/02* (2013.01); *B23P 19/067* (2013.01); *B25B 23/00* (2013.01)

(58) Field of Classification Search
  CPC ........ B25B 29/02; B25B 23/00; B25B 13/06; B23P 19/067
  USPC .................................. 81/57.38, 124.2, 121.1
  See application file for complete search history.

(56) References Cited

U.S. PATENT DOCUMENTS

| | | | | |
|---|---|---|---|---|
| RE4,019 E | * | 6/1870 | Kroh | 81/121.1 |
| 2,239,548 A | | 4/1941 | Butler | |
| 2,760,393 A | * | 8/1956 | Stough | 81/57.38 |
| 2,866,370 A | * | 12/1958 | Biach | 81/57.37 |
| 3,877,326 A | * | 4/1975 | Kock et al. | 81/57.38 |
| 4,047,456 A | * | 9/1977 | Scholz | 81/57.38 |
| 5,450,772 A | * | 9/1995 | Barone et al. | 81/121.1 |
| 5,463,812 A | * | 11/1995 | Aschenbruck et al. | 29/889.21 |
| 7,513,178 B2 | * | 4/2009 | Hohmann et al. | 81/57.38 |
| 7,661,336 B2 | * | 2/2010 | Hohmann et al. | 81/57.38 |
| D673,193 S | * | 12/2012 | Dickrede | D15/139 |
| 2011/0271798 A1 | | 11/2011 | Wagner et al. | |

FOREIGN PATENT DOCUMENTS

DE  20 2008 010 206 U1  12/2008
WO     2010/054959 A1   5/2010

\* cited by examiner

*Primary Examiner* — Hadi Shakeri
(74) *Attorney, Agent, or Firm* — Gudrun E. Huckett

(57) ABSTRACT

A tensioning device for threaded bolts has a supporting tube and a cylinder with a hydraulic supply connected thereto. The supporting tube surrounds the threaded end section of the bolt. A piston is moveable in the cylinder longitudinally. An exchange socket is connected to the piston and driven axially by it. The exchange socket has a first end with internal thread to be screwed onto the threaded end section and a second end with an external polygon member. A tool attachable to the external polygon member enables turning of the exchange socket. The tool has a cup-shaped section having a first open end and an inner side with tool faces that engage the external polygon member. The tool has a drive section that is slimmer than the cup-shaped section and connected to a second end of the cup-shaped section. The drive section extends away from the cup-shaped section.

5 Claims, 2 Drawing Sheets

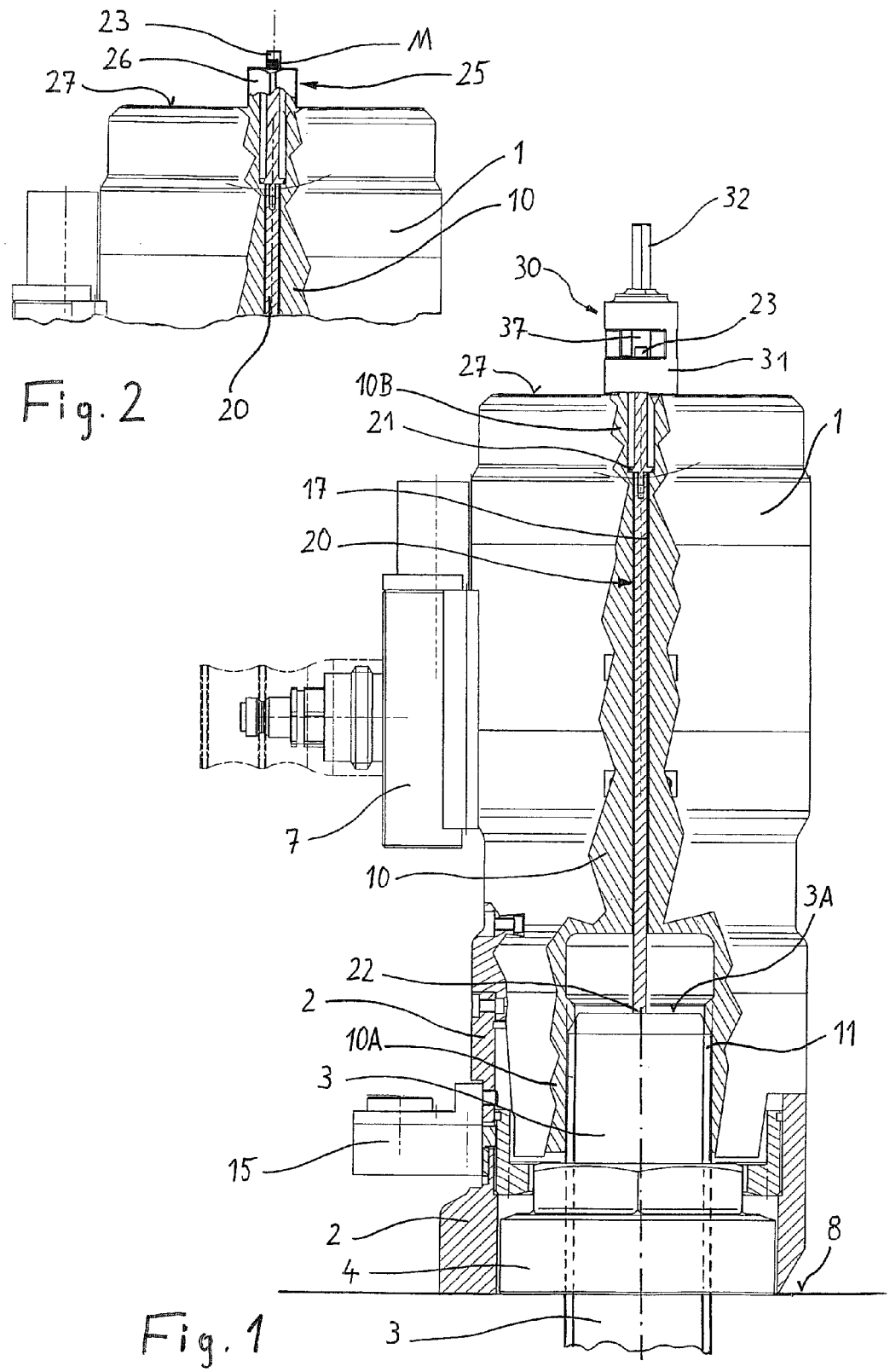

TENSIONING DEVICE FOR EXTENDING A THREADED BOLT, AND TOOL SUITABLE FOR THIS PURPOSE, PREFERABLY DRIVE ADAPTER

BACKGROUND OF THE INVENTION

The invention relates first of all to a tensioning device for extending a threaded bolt by way of tension on the threaded end section thereof, having a supporting tube which surrounds the threaded end section, a cylinder which is arranged in an extension of the supporting tube and has at least one piston which can be moved therein in the longitudinal direction and can be connected to a hydraulic supply, an exchange socket which is configured such that it can be driven axially by the piston and is provided at its one end with an internal thread for screwing to the threaded end section and at its other end with an external polygon member, and a tool which can be attached releasably to the external polygon member in order to turn the exchange socket.

Furthermore, the invention relates to a tool which is intended for a tensioning device of this type and is preferably configured as a drive adapter.

A tensioning device of the generic type for threaded bolts is known from WO 2010/054959 A1. In order for it to be possible to check the length of that threaded end section of the threaded bolt which is gripped by the exchange socket, a slim measuring gauge is seated in the exchange socket in a longitudinally displaceable manner. The said measuring gauge is supported with its lower end against the end face of the threaded bolt to be tensioned. Its other end protrudes out of the exchange socket and is provided at this exposed end with a marking, using which it can be read off whether the threaded projection, that is to say the length of the threaded section which is gripped by the exchange socket, is sufficient for the tensioning process. In order to screw the exchange socket onto the threaded bolt, the tensioning device is rotated about its axis so that the exchange socket is screwed onto the free end of the threaded section of the threaded bolt.

As an alternative in connection with the tensioning device of WO 2010/054959 A1, there is the option, not disclosed however, to employ an external square, provided on the exchange socket anyhow and is located below the exposed pin end, for screwing the exchange socket onto the threaded bolt. An open-end or ring spanner could be attached theoretically to the square in order to rotate the exchange socket and thus to screw it with its internal thread arranged at the bottom onto the threaded bolt before the extension process can begin. In contrast, tools other than open-end or ring spanners would be less suitable since they threaten to damage the slim measuring gauge and the marking provided thereon.

In practice, in which frequently a multiplicity of similar tensioning processes have to be carried out one after another, the downtimes for tightening and subsequent releasing again of the exchange socket by means of an open-end or ring spanner would be time-consuming.

The invention is based on the object of shortening the downtimes which are associated with the individual tensioning process.

SUMMARY OF THE INVENTION

In order to achieve this object, it is proposed in a tensioning device of the generic type for extending a threaded bolt that the tool is composed of a cup-shaped section, which is provided on its inner side with tool faces for rotational coupling to the external polygon member, and a slim drive section slimmer than the cup-shaped section and arranged in an extension with respect to the cup-shaped section.

The tool which can be attached releasably to the external polygon member is a drive adapter having at least two functional sections. A cup-shaped section forms a first functional section, which cup-shaped section is provided on its inner side with tool faces which ensure the positively locking rotational connection to the external polygon member on the exchange socket. The second functional section is a slim drive section which is configured integrally as an extension with respect to the cup-shaped section. The said drive section is preferably solid and is provided on its circumference with coupling structures for a motor-operated screwdriver, for example for connection to the chuck of an electric screwdriver. It is possible in this way to screw the exchange socket fixedly by way of, for example, a cordless screwdriver which is available everywhere, and to unscrew it again after the tensioning process. The downtimes which are associated with the tensioning process can be reduced considerably in this way.

The exchange socket is preferably provided with a longitudinal channel and a pin which can be moved longitudinally therein, the first pin end of which pin can be supported against that end of the threaded bolt which has the threaded end section and the second pin end of which pin protrudes beyond the external polygon member. In this case, the cup-shaped section of the tool is composed of a first longitudinal section which has the tool faces and of an adjoining second longitudinal section which forms a cavity on the tool longitudinal axis, the second longitudinal section being provided with at least one viewing opening at the level of the second pin end. The said viewing opening allows viewing from the exterior of the second pin end and a visual marking which is present thereon. The said marking is preferably a good/bad marking, for example a green label which, if it can be seen through the viewing opening, makes it possible for the operator to assume that there is a sufficient threaded engagement length between the exchange socket on one side and the end of the threaded bolt to be tensioned on the other side.

In order for it to be possible to detect the marking which is arranged inside the drive adapter largely independently of the rotational position of the said drive adapter, a further refinement of the tensioning device proposes that the second longitudinal section is provided at the level of the second pin end or the marking with a total of two viewing openings which are arranged so as to lie opposite one another in relation to the cavity. It goes without saying that the number of the said viewing openings can also be three or four, as long as the stiffness of the drive adapter with respect to torques is not influenced disadvantageously as a result.

Furthermore, in order to achieve the abovementioned object, a tool which is suitable for use with the threaded-bolt tensioning device and preferably a drive adapter are proposed, which tool is composed of a cup-shaped section, which is provided on its inner side with tool faces for rotational coupling to an external polygon member, and a slimmer drive section which is arranged in an extension with respect to the cup-shaped section.

According to one refinement of the tool, the drive section is of solid configuration and is provided on its circumference with coupling faces or structures for a motor-operated screwdriver.

According to a further refinement of the tool, the cup-shaped section is composed of a first longitudinal section which has the tool faces and an adjoining second longitudinal section which forms a cavity on the tool longitudinal axis, the second longitudinal section being provided with at least one viewing opening.

In relation to the number of the said viewing openings, one embodiment is preferred, in which there are two viewing openings which are arranged so as to lie opposite one another in relation to the cavity. However, the number thereof can also be greater, given a corresponding strength of the drive adapter.

BRIEF DESCRIPTION OF THE DRAWINGS

Further details and advantages result from the following description of one exemplary embodiment shown in the drawings.

FIG. 1 shows a hydraulically operating threaded-bolt tensioning device which is shown partially sectioned, attached to a threaded bolt which is secured by way of a nut and supported on a base.

FIG. 2 shows the upper part of the threaded-bolt tensioning device according to FIG. 1, but without the drive adapter attached at the top.

DESCRIPTION OF PREFERRED EMBODIMENTS

Figure 1A:
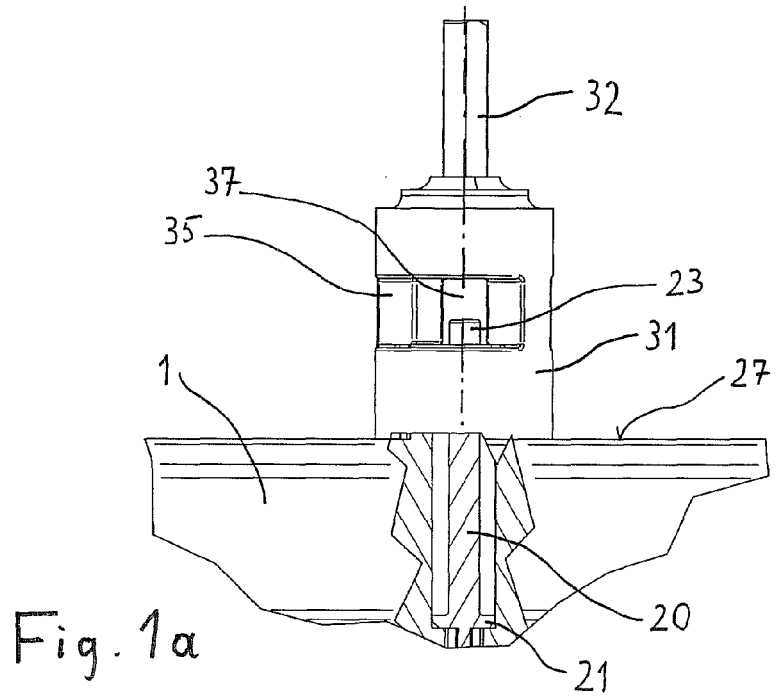
FIG. 1a shows an enlarged illustration of the upper drawing part of FIG. 1.

The hydraulically operated tensioning device serves to tighten and optionally also release highly loaded screw connections. The tensioning device has the task of applying a predefined prestressing force to the threaded bolt 3 in the bolt longitudinal direction for a defined time, in order to produce the possibility of tightening or re-tightening that nut 4 of the screw connection without torque, which nut 4 is screwed onto the threaded bolt 3. For this purpose, an exchange socket of the tensioning device which will be described in greater detail in the following text is screwed onto that thread of the threaded bolt 3 which protrudes beyond the nut 4 and is subsequently subjected to hydraulic tension, as a result of which the threaded bolt 3 extends in the longitudinal direction.

The screw-in-depth of the threaded bolt is limited by the length of the threaded end section A which is available as bolt projection above the nut 4. The screw-in-depth which is made available should be at least equal to the thread diameter of the bolt, preferably 1.5 times it. Only maintaining a minimum screw-in-depth ensures that the threaded bolt 3 is not damaged by the tensioning process. If a minimum value for the length of the threaded engagement on the threaded end section A is not adhered to, snapping can occur at the threaded bolt end.

The bolt tensioning device has a housing comprising one or more cylinders 1. The rigid continuation of the housing or the cylinders 1 in the longitudinal direction L downwards is formed by a supporting tube 2 which is open on its underside and is supported on that base 8, usually a machine part, on which the nut 4 is also supported. A hydraulic connection 7, via which the tensioning device is connected to a hydraulic supply, is situated laterally on the housing which is composed of the cylinders 1.

Moreover, a gear mechanism 15 which operates through openings in the supporting tube 2 can be provided, by way of which gear mechanism 15 the nut 4 which is screwed onto the threaded bolt 3 can be rotated. This rotation is of course only possible if the tensioning device is working, and the nut 4 is therefore not loaded by considerable friction.

The housing can contain one or more hydraulic cylinders which are connected to the external hydraulic supply via a flexible, pressure-resistant hydraulic line. Sealed towards the inner wall of the cylinder 1, a piston is arranged in each of the cylinders 1 such that it can be moved in the longitudinal direction. When the hydraulic supply is switched on, the pistons which are arranged in the individual cylinders are raised up by the feeding of hydraulic pressure into the working chambers of the said individual cylinders. This can take place counter to the action of a compression spring which is supported on the piston from the top.

The pistons are connected rigidly to an exchange socket 10 which is arranged centrally in them, with the result that the longitudinal movement of the pistons leads to an identical movement of the exchange socket 10.

The exchange socket 10 is designed such that it can be exchanged by means of suitable measures; it can therefore be exchanged for an exchange socket 10 with a different geometry, whereas the piston/pistons do not have to be exchanged for other pistons.

The exchange socket 10 is composed integrally of a lower coupling section 10A and an upper shank section 10B. The coupling section 10A is situated within the supporting tube 2 and has an internal thread 11 which can be screwed to the external thread of the threaded bolt 3. The shank section 10B of the exchange socket 10 is surrounded by the piston/pistons, to which it is connected rigidly, preferably by way of a screw connection.

In order to tension the threaded bolt, first of all the internal thread 11 of the exchange socket 10 is screwed onto the threaded end section A of the threaded bolt.

As a result of the subsequent feeding in of hydraulic pressure, the pistons which are guided in the cylinder 1 rise up while driving the exchange socket 10, as a result of which a longitudinal extension of the threaded bolt 3 occurs. A frictional loss of the underside of the nut 4 is associated with this, with the result that the said nut 4 can now be rotated on the thread of the bolt, that is to say can be re-tightened.

It is important for the tensioning operation that the screw-in-depth of the threaded bolt 3 which is available as a result of the length of the threaded end section A is utilized with the corresponding internal thread 11 of the exchange socket 10, and a sufficient length of the threaded engagement is achieved reliably.

A pin 20 is situated in a longitudinal guide 17 which is arranged centrally in the exchange socket 10 for controlling the threaded engagement length. The said pin 20 is provided with a collar or a widened portion 21, against which a spring is supported which is supported at the other end against the exchange socket 10. In this way, the pin 20 which can be moved longitudinally in the longitudinal guide 17 of the exchange socket is always loaded by a force which loads it slightly downwards towards the threaded bolt 3.

The pin 20 is supported with its lower end 22 axially against the end face 3A of the threaded bolt 3. The other end 23 of the pin 20 is situated in the region of the upper part of the tensioning device. Measures are taken there for detecting the longitudinal position of the pin end 23 and therefore also the position of the pin 20. This longitudinal position can be used to derive the height, at which the lower pin end 22 is situated, which in turn allows a direct conclusion to be made about the length of the threaded engagement at the threaded end section A. This is because, if the length A of the threaded engagement were smaller than shown in the situation according to FIG. 1, the pin 20 would be lowered further, which can be detected from the position of the upper pin end 23 relative to the exchange socket 10 which surrounds the said pin end 23.

For this purpose, the pin 20 is provided at its upper, exposed end with a marking M, for example a green or a red colour marking as good/bad marking. The user can detect with one glance from its vertical position in relation to the upper edge of the exchange socket 10 or a corresponding marking on the exchange socket 10 whether the threaded engagement at A has a sufficient length.

The upper pin end 23 is situated partially within a longitudinal section 25 of the exchange socket 10, which longitudinal section 25 protrudes upwards beyond the end face 27 of the cylinder housing 1 of the tensioning device.

Depending on the respective good or bad status, the marking M on the pin 20 is situated partially or completely above the said longitudinal section 25, and in this case is exposed and can be viewed from all sides.

On the longitudinal section 25 which protrudes beyond the end face 27 of the cylinder housing 1, the exchange socket 10 is provided with an external polygon member 26, for example with a hexagon. A tool can be attached to the external polygon member 26, in order to rotate the exchange socket 10 relative to the cylinder housing 1. This is because, as has already been described, the exchange socket 10 has to be screwed with its thread 11 completely onto the threaded end section A in a first step.

This screwing-on operation, if it takes place by hand and using an open-end or ring spanner which is attached to the external polygon member 26, is very time-consuming. It saves considerably more time to attach an electric screwdriver to the external polygon member 26, which electric screwdriver is provided with a corresponding attachment tool, usually a tool nut. However, an attachment tool could damage the exposed end of the measuring gauge with the marking M attached to it. In addition, it could impede the view of the marking M. The operator might therefore not be able to rotate the exchange socket 10 at the same time by means of an electric screwdriver and keep the marking M in view during this.

In a deviation from the structural design of the customary attachment tools, the rotation of the exchange socket 10 therefore takes place by means of a drive adapter 30 which can be attached to the external polygon member 26 from above, which drive adapter 30 leaves sufficient space and freedom of movement in its interior for the exposed end of the measuring gauge and makes it possible to view the good/bad marking which is attached at the pin end.

FIG. 1 shows the device with the drive adapter 30 which can be attached, and FIG. 2 shows the device without it.

The drive adapter 30 is a tool comprising a cup-shaped section 31 which is provided on its inner side with preferably six tool faces 33 for rotational coupling to the external polygon member 26, and a drive section 32 which is slimmer in comparison with the section 31 and is arranged in an extension with respect to the section 31. The chuck of an electric screwdriver, for example a cordless screwdriver, can be clamped to the drive section 32. To this end, the drive section 32 is provided with corresponding coupling structures.

The cup-shaped section 31 is composed of a first longitudinal section L1 which has the tool faces 33 on the inside and a second longitudinal section L2 which adjoins it in the tool longitudinal direction and forms a cavity 37 which is arranged on the tool longitudinal axis.

The additional cavity 37 which results from the cup shape has a width and height such that the exposed end of the measuring gauge 20 is accommodated therein, to be precise regardless of the respective vertical position of the measuring gauge 20. On account of the additional cavity 37 which is achieved by the cup shape of the section 31, contact with the measuring gauge 20 cannot occur while the exchange socket 10 is being screwed onto the threaded bolt 3, and therefore damage of the measuring gauge itself or the marking M which is attached to it cannot occur.

Figures 3, 4:
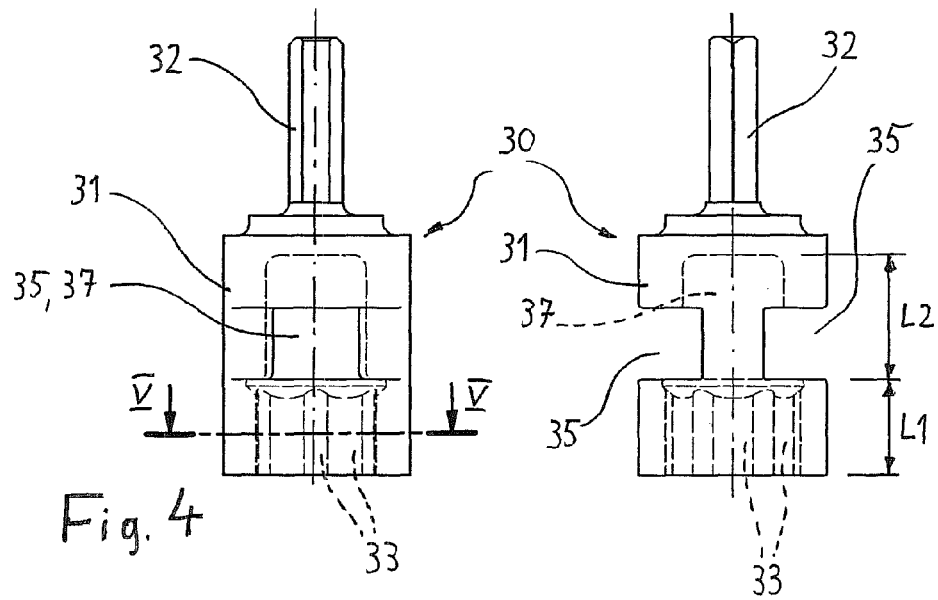
FIG. 3 shows an individual illustration of a side view of the drive adapter.
FIG. 4 shows another side view of the drive adapter, the viewing plane being rotated by 90° with respect to the viewing plane according to FIG. 3.
Figure 5:
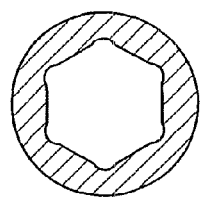
FIG. 5 shows a cross section through the drive adapter in accordance with the sectional plane V-V which is illustrated in FIG. 3.

In order for it to be possible to always see the marking M from the outside, the second longitudinal section L2 is provided at the level of the marking M with at least one viewing opening 35, through which it is possible to view the interior of the cavity 37. According to FIG. 3, there are two viewing openings 35 which are arranged so as to lie opposite one another in relation to the cavity 37 in the exemplary embodiment, but the number thereof can also be greater.

For a satisfactory view into the cavity 37, the viewing openings 35 should be so great in the circumferential direction that in total they make a view into the central cavity 37 and of the marking M which is situated there possible over at least two thirds of the circumference.

The specification incorporates by reference the entire disclosure of German priority document 20 2012 103 565.0 having a filing date of Sep. 18, 2012.

While specific embodiments of the invention have been shown and described in detail to illustrate the inventive principles, it will be understood that the invention may be embodied otherwise without departing from such principles.

LIST OF REFERENCE CHARACTERS

1 Cylinder
2 Supporting tube
3 Threaded bolt
3A End face of threaded bolt
4 Nut
5 Piston
7 Hydraulic connection
8 Base
10 Exchange socket
10A Coupling section
10B Shank section
11 Internal thread
15 Gear mechanism
17 Longitudinal guide
20 Pin
21 Widened portion
22 Pin end
23 Pin end
25 Longitudinal section
26 External polygon member
27 End face
30 Tool, drive adapter
31 Cup-shaped section
32 Drive section
33 Tool face
35 Viewing opening
37 Cavity
A Threaded end section
L1 Longitudinal section
L2 Longitudinal section
M Marking

What is claimed is:

1. A tensioning device for extending a threaded bolt by applying tension on a threaded end section thereof, the tensioning device comprising:
- a housing comprised of a supporting tube and a cylinder connected to the supporting tube, wherein the supporting tube surrounds the threaded end section;
- at least one piston moveably arranged in the cylinder in a longitudinal direction of the cylinder;
- a hydraulic supply connected to the cylinder;
- an exchange socket operatively connected to the at least one piston so as to be driven axially by the at least one piston, wherein the exchange socket has a first end provided with an internal thread that is to be screwed onto the threaded end section and further has a second end provided with an external polygon member;
- a tool adapted to be attached releasably to the external polygon member so as to be able to turn the exchange socket, wherein the tool is composed of
- a cup-shaped section having a first end that is open and an inner side extending inwardly from the first end, the inner side provided with tool faces adapted to engage the external polygon member for rotational coupling, and
- a drive section that is slimmer than the cup-shaped section and is connected to a second end of the cup-shaped section that is opposite the first end, wherein the slim drive section extends away from the cup-shaped section;
- wherein the exchange socket is provided with a longitudinal channel and a pin arranged in the longitudinal channel and moveable in the longitudinal channel in a longitudinal direction of the longitudinal channel, wherein the pin has a first pin end supported against an end of the threaded bolt provided with the threaded end section, wherein the pin has a second pin end protruding beyond the external polygon member, wherein the cup-shaped section is composed of a first longitudinal section provided with the tool faces and of an adjoining second longitudinal section forming a cavity coaxial to a tool longitudinal axis of the tool, wherein the second longitudinal section is provided with a viewing opening at a level where the second pin end is positioned.

2. The tensioning device according to claim 1, wherein the drive section is solid and has a circumference provided with coupling faces to be engaged by a motor-operated screwdriver.

3. The tensioning device according to claim 1, wherein the second longitudinal section is provided at the level of the second pin end with two of said viewing opening, wherein said two viewing openings are arranged opposite each another relative to the cavity.

4. The tensioning device according to claim 1, wherein the second pin end is provided with a visual marking at the level of said viewing opening.

5. The tensioning device according to claim 4, wherein the marking is a good/bad marking.

* * * * *